United States Patent

Caldwell

[15] 3,658,244
[45] Apr. 25, 1972

[54] AIR TEMPERING SYSTEM
[72] Inventor: Roland B. Caldwell, Columbus, Ohio
[73] Assignee: Ranco Incorporated, Columbus, Ohio
[22] Filed: Mar. 20, 1970
[21] Appl. No.: 21,452

[52] U.S. Cl..................................237/2, 236/37, 236/78
[51] Int. Cl..........................................G05d 23/24
[58] Field of Search..........................................236/9, 13, 37

[56] References Cited

UNITED STATES PATENTS

| | | | |
|---|---|---|---|
| 2,363,748 | 11/1944 | Robb | 236/9 |
| 2,504,010 | 4/1950 | Dicke | 236/9 |
| 2,656,111 | 10/1953 | Lehane et al. | 236/9 |
| 2,782,994 | 2/1957 | Dotson | 236/78 |
| 2,889,112 | 6/1959 | McCormack | 236/9 |
| 3,404,835 | 10/1968 | Rodgers | 236/13 |
| 3,428,115 | 2/1969 | Caldwell | 236/13 X |
| 3,498,332 | 3/1970 | Lybrook | 137/630.14 |

Primary Examiner—Edward J. Michael
Attorney—Watts, Hoffmann, Fisher & Heinke

[57] ABSTRACT

An air tempering system for an automotive vehicle is disclosed in which heating of air is controlled by the position of a valve member in an air heating heat exchanger. A servomechanism including a servomotor operates the valve between a maximum air heating position and a minimum air heating position. The servomechanism also controls the speed of a blower unit to provide maximum blower speeds when the valve member is at either limit position and minimum blower speed when the valve is intermediate the limit positions.

A temperature responsive circuit controls the servomotor in positioning the valve member. A motor control network is provided which energizes the motor to park the valve member in a predetermined position when the temperature responsive circuit is disconnected from its power supply by opening the ignition switch.

13 Claims, 3 Drawing Figures

INVENTOR.
ROLAND B. CALDWELL

AIR TEMPERING SYSTEM

CROSS REFERENCED U.S. PATENTS AND APPLICATIONS

U.S. Pat. No. 3,404,835 issued Oct. 8, 1968 to Gerald L. Rodgers, entitled Automotive Air Temperature Control.

U.S. Letters Patent No. 3,498,332, issued Mar. 3, 1970 to Arnold T. Lybrook, entitled Liquid Flow Control Valve.

BACKGROUND OF THE INVENTION

1. Field of the Invention

The present invention relates to automotive air tempering systems and more particularly relates to automotive air tempering systems in which a movable member and a blower unit cooperate to control the degree of tempering of air in the system.

2. The Prior Art

Automotive air tempering systems have sometimes utilized an air cooling heat exchanger, formed by an evaporator of a vehicle air conditioning system, and an air heating heat exchanger, heated by engine coolant, for reheating the chilled air.

In some systems these heat exchangers are disposed in series in a duct and a movable air directing vane has directed a variable proportion of the chilled air across the heater to control the final temperature of mixed, heated and chilled air introduced into the passenger compartment. In other systems, the degree of reheating of the air is determined by the position of an engine coolant control valve associated with a heater core which forms the air heating heat exchanger.

These systems have included blower units for producing forced flows of air through the ducts to facilitate heat transfer between the duct air and the heat exchangers. Blower speed control switches are provided for varying the blower speed. When maximum air heating is demanded, the blower speed is maximized. When maximum air cooling is demanded, the blower speed is also maximum. When intermediate air tempering is required, the blower unit operates at a lesser speed.

The air ducts have included dampers which are positioned to direct tempered air into a passenger compartment at locations depending on the air temperature. For example when the air is heated to maximum temperatures the dampers are positioned to direct this air into the vehicle along the floor. When chilled air is called for, the dampers are positioned to direct the chilled air upwardly into the compartment. The dampers are frequently actuated by pneumatic actuators associated with the vehicle vacuum system.

The vane, the operation of the blower speed control switch and positioning of damper control valves have been controlled by a servomechanism which is electrically operated. Small electric motors have been used to drive the blower switch assembly, vane and damper valves through the gear trains. The blower speed has usually varied according to the vane and damper positions.

Automotive air tempering systems of the type referred to are subject to extreme atmospheric and passenger compartment air temperature variations over relatively short periods. Furthermore, such changes frequently occur when the vehicle is not operating. When the vehicle is not operating, the systems are deenergized and thus unable to compensate for air temperature changes as they occur.

This environmental problem becomes particularly troublesome whenever the daily atmospheric air temperature varies throughout a relatively wide range. For example, atmospheric air temperatures in the early morning may be relatively low and when an automobile is operated at this time the temperature control system is likely to require maximum heating of the duct air. When the automobile is parked, the ignition switch of the vehicle is opened with the blower speed switch positioned for maximum blower speed and the heater valve in a fully open position.

Later in the day, the atmospheric air temperature may be relatively high. Further, if the automobile is unshaded, the passenger compartment air temperature can be considerably higher than atmospheric. When the vehicle engine is started under these conditions, the temperature control system immediately produces a maximum speed forced flow of air through the air duct. Hot air from the duct is thus forced into the already warm passenger compartment.

Upon energization of the control system through the ignition switch, the system demands maximum cooling of the passenger compartment. Hence the vane, blower speed control switch and dampers are operated completely through their ranges of movement. The result is that the blower speed is reduced to minimum and increased again to its maximum speed, the vane is moved to its opposite limit of movement and the dampers operate to alter the path of air flow into the compartment.

The noted operation of the prior art temperature control systems in the circumstances described is undesirable for several reasons. First, the seemingly erratic operation of the blower unit is annoying to occupants of the vehicle, and may cause the operator to erroneously conclude that the air tempering system is malfunctioning. Secondly, the servomotor is operated over an unnecessarily long period and at high speeds. Thirdly, the occupants of the vehicle are generally initially subjected to a forced flow of relatively hot duct air while seated in an already hot passenger compartment.

When the vehicle ceases to be operated under conditions when maximum cooling is required, it frequently happens that heating is required when the vehicle is next started. In such circumstances, the system again operates in a seemingly erratic manner, substantially as described above.

Automotive air tempering systems of the general type referred to have had engine coolant supplied to the heater core when the control system was deenergized with the vehicle engine operating. When the control system was energized air was blown across the air cooling heat exchanger, onto the hot heater core and then into the passenger compartment. The air picked up moisture from condensation on and around the cooling heat exchanger and was heated by the heater core. This hot moist air was responsible for immediately fogging the vehicle windows and particularly the windshield. This has been an objectionable feature of such air tempering systems.

SUMMARY OF THE INVENTION

The present invention provides a new and improved air conditioning control system for furnishing conditioned air to a space wherein a movable member is positionable throughout a range of positions to control the air temperature in the space and in which the movable member is moved to a predetermined "parked" position when the control system is deactivated. The new control system is thus enabled to quickly and appropriately respond to sensed conditions when the control system is reactivated.

In one preferred construction of the invention, an air conditioning or air tempering system is provided for heating and chilling air introduced into a passenger compartment of an automotive vehicle.

The preferred air conditioning system comprises an air cooling heat exchanger, an air heating heat exchanger in the form of a heater core, and a blower unit. These components are disposed in a duct in the vehicle so that air in the duct is tempered and directed into the passenger compartment. The air tempering system is associated with a control system for modulating the heat content of the air by controlling positioning of a movable coolant valve member in heater core of the tempering system. The valve member is positioned by a servomotor which is operated in response to sensed air temperatures.

The servomotor is energized each time the control system is deenergized to automatically position the heater valve in its closed position. A blower speed control switch is simultaneously operated to a low speed position. After the water valve is closed and the blower speed setting reduced the servomotor is automatically deenergized or parked. This automatic "parking" of the servomotor minimizes the seemingly erratic operation of the system when the control system is reenergized; avoids unnecessarily long periods of operation of the servomotor; prevents initial high volume flows of hot air being forced into the compartment; and prevents fogging of the windshield when the system control switch is closed when the vehicle engine is operating.

In a preferred embodiment of the invention a servomotor is connected to the vehicle power supply through temperature responsive motor controlling circuitry, a switch operated by the vehicle ignition key and a manual control switch for the air tempering control system. When the ignition switch and system control switch are closed the servomotor is operated by the motor controlling circuitry to govern operation of the air tempering system in accordance with sensed air temperatures. Parking circuitry is associated with the servomotor which is effective to detect when either the ignition switch of the manual control switch are opened to deenergize the motor controlling circuitry and to operate the servomotor to its parked position in response to opening of either switch. If the servomotor happens to be in the park position when the ignition switch or the manual control switch opens, the parking circuitry is ineffective to operate the servomotor.

The park circuitry operates the servomotor to adjust the blower to a relatively low speed setting and to close the water valve to prevent engine coolant from flowing through the heater core. The tempering system is thus conditioned so that when the motor controlling circuitry is reenergized, the heater core is unheated and the blower speed is not altered in an apparently erratic manner. This eliminates fogging the windshield, and the objectionable blower operation. Furthermore, reenergization of the blower unit at the low speed park setting slowly purges high temperature air from the tempering system ducting when the vehicle has been parked on a hot day. This eliminates the possibility of blowing the hot duct air onto occupants of the vehicle when the engine is restarted.

The parking circuitry preferably includes a first switch which is operated to enable energization of the servomotor when opening of the manual control switch or ignition switch is sensed. A second park position switch enables operation of the servomotor toward the park position and prevents further operation of the servomotor through the parking circuitry when the servomotor is in its park position.

A principal object of the present invention is the provision of a new and improved automotive air tempering system which is actuated to a particular operating condition whenever the vehicle engine is turned off or when the tempering system is switched off whereby seemingly erratic operation of the system is avoided when it is reactivated.

Other objects and advantages of the invention will become apparent from the following detailed description made with reference to the accompanying drawings which form a part of the specification.

DESCRIPTION OF A PREFERRED EMBODIMENT

Figure 1:
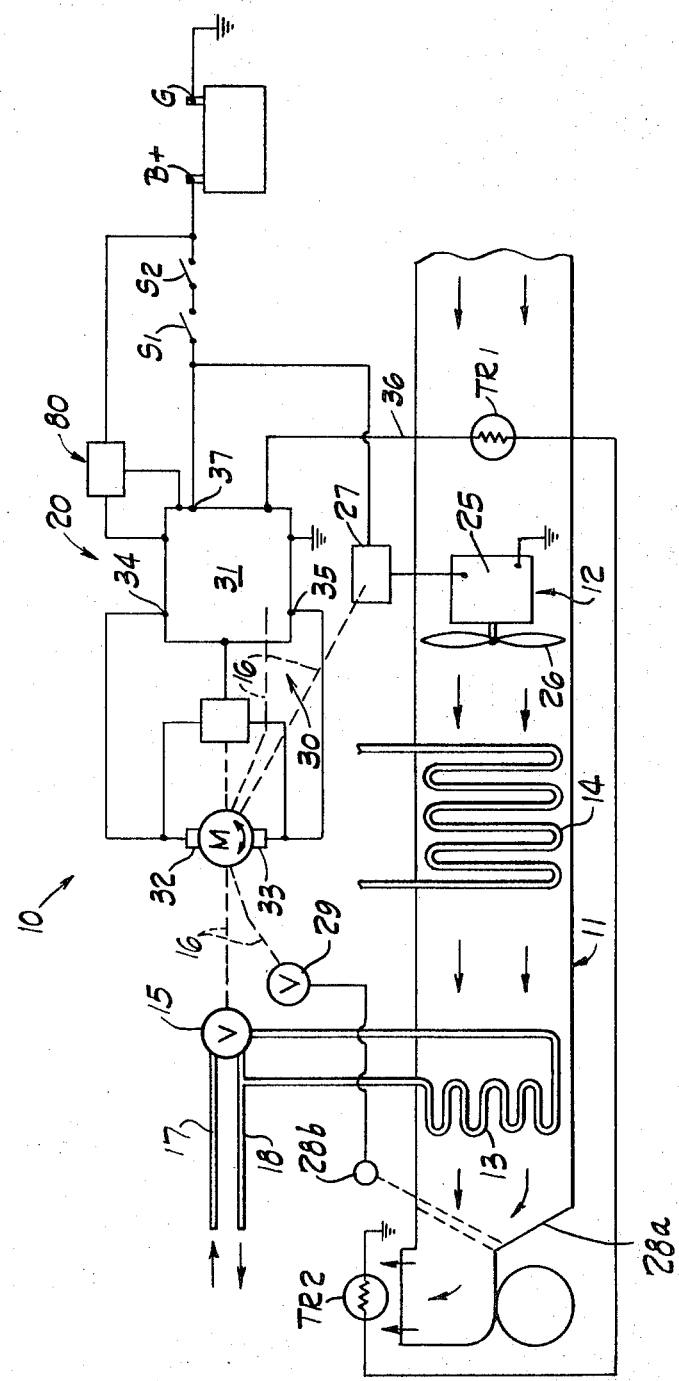
FIG. 1 is a schematic illustration of an air tempering system embodying the present invention.

An air tempering system 10 for an automotive vehicle is shown in FIG. 1. The automotive vehicle (not shown) has a liquid cooled internal combustion engine and is equipped with a conventional compressor-condenser-evaporated refrigeration system for cooling the passenger compartment. The air tempering system 10 includes a duct 11 through which air is directed into the passenger compartment, a blower unit 12 for producing a forced flow of air through the duct, an air heating heat exchanger in the form of a conventional heater core 13 disposed in the duct 11, and an air chilling heat exchanger 14 (the evaporator of the refrigeration system) disposed in the duct between the blower unit 12 and heater core 13.

Air flowing through the duct 11 is chilled by the evaporator 14 after which the air may be reheated to a desired degree as it passes through the heater core 13. When atmospheric air temperatures increase above a predetermined degree, the flow of engine coolant through the heater core 13 is terminated and the duct air is chilled only by the evaporator 14.

Figure 2:
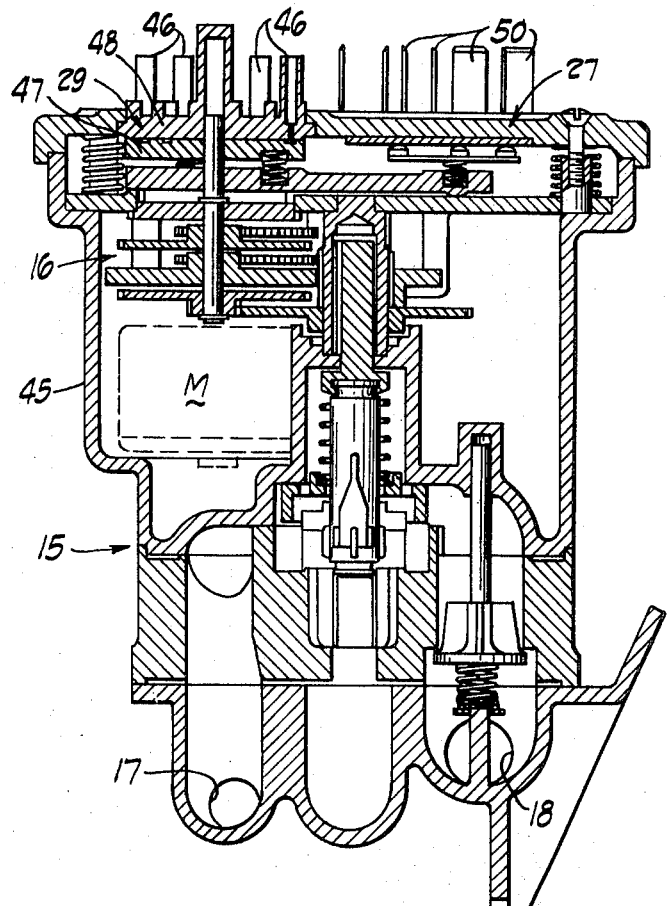
FIG. 2 is a cross sectional view of a part of the system of FIG. 1.

The flow of engine coolant through the heater core is controlled by a valve 15 to control the temperature of the air entering the passenger compartment. The valve 15 includes a valve member which is moved to control the coolant flow by a reversible permanent magnet D.C. motor M acting through a gear reduction 16. The valve 15 communicates with engine coolant pipes 17, 18 and the tubes of the heater core 13 and is preferably constructed as shown in FIG. 2.

When the valve 15 is "closed," engine coolant flowing to the valve through the pipe 17 is bypassed around the heater core 13 and to a radiator of the vehicle through the pipe 18. When the valve is "open" engine coolant flows through the heater core 13 from the pipe 17, and then to the radiator through the pipe 18 for enabling maximum heat transfer to air in the duct 11. The valve member is adjustably movable between its "open" and "closed" positions to proportion the amount of bypassed coolant and thereby determine the amount of heat available for transfer from the heater core to the duct air.

Heat transfer between the heater core 13 and air in the duct 11 is further controlled by operation of the blower unit 12. The unit 12 includes a blower motor 25, a blower 26, and a speed control switch assembly 27 for the blower motor 25. The switch assembly 27 is operated to vary the impedance of the fan motor energized circuit and thus controls the rotational speed of the blower 26. The switch assembly 27 is operated from the motor M through the gear train 16. The blower speed control switch 27 may be of any suitable type and is therefore not illustrated in detail.

The blower motor 25 is operated at its maximum speed when demand for heating or cooling is maximum as is described presently. Additionally, the speed control switch assembly 27 operates the blower at its maximum speed under certain other conditions such as, for example, when defogging of the vehicle windshield is necessary.

The duct is also provided with dampers which govern the direction of tempered air flow into the passenger compartment. When the passenger compartment is being heated, the damper is positioned to direct the heated air along the floor of the compartment when cool air is supplied to the passenger compartment, it is directed upwardly by the damper. A damper assembly 28, including a damper member 28a and a vacuum operated actuator 28b is illustrated in FIG. 1. The actuator 28b is operated to move the damper in response to actuation of a vacuum valve 29. The valve 29 is driven through the gear reduction 16 from the motor M. The valve 29 communicates vacuum to the actuator 28b from the intake manifold of the vehicle engine.

Operation of the motor M is governed by an electrical control system 30 which is connectible across the terminals B+, G of a battery of the vehicle through control switches S1 and S2. The switch S1 may be an ignition switch of the vehicle or a switch operated from the ignition switch while the switch S2 is a manual control switch preferably of the "push button" type.

The control system 30 includes motor control circuitry 31 for governing the direction and speed of rotation of the motor M. The circuitry 31 is connected across the motor terminals 32, 33 by way of terminals 34, 35, respectively, through which power is supplied to the motor.

As shown in FIG. 1 the circuitry 31 includes a "sensor string" 36 having series connected temperature responsive resistance elements TR1, TR2 which are exposed to atmospheric air and passenger compartment air, respectively. These elements are preferably thermistors and have negative temperature coefficients of resistance. The thermistor TR1 is an ambient compensating element. Additional thermistors can be provided in the sensor string 36 if desired.

The circuitry 31 operates the motor M according to sensed temperatures. When passenger compartment air temperature is substantially lower than a preselected desired temperature, the circuitry 31 drives the motor M in a direction to fully open the valve 15 and simultaneously operates the speed control switch assembly 27 to a position in which the blower motor 25 operates at maximum speed. Under such circumstances, the flow of engine coolant through the heater core 13 is maximum. Since the flow of air through the duct 11 is maximum, heat transfer between heater core and the air in the duct is maximized. This heated air is directed into the passenger compartment.

The vacuum valve 29 is driven through the gear train 16 so that when the motor M has operated the valve 15 and blower motor 25 to the maximum heat positions, the damper 28a is positioned to direct the heated air along the floor of the compartment.

As the passenger compartment air temperature rises toward the preset desired temperature, the resistance of the thermistor TR2 is reduced and the network 31 briefly operates the motor M in a rotational direction toward closing the valve 15 and reducing the speed of the blower motor 25. This reduces the amount of heat introduced into the passenger compartment. The motor M continues to adjust the valve 15 and switch 27 in the manner described as passenger compartment air temperature increases.

When the passenger compartment temperature has reached the preset desired temperature, the motor M maintains the valve 15 in a position for introducing heat into the passenger compartment at the same rate that heat is lost from the compartment.

When actual passenger compartment air temperature is higher than the preselected temperature, the circuitry 31 operates the motor M to close the valve 15 and operate the blower motor 25 at its maximum speed. This maximizes heat transfer from the duct air to the evaporator 14 and a maximum cooling effect is obtained. The damper 28a is operated to direct the chilled air upwardly into the compartment.

As the passenger compartment air temperature is reduced towards the preset temperature, the circuitry 31 operates the motor M to reduce the speed of the blower unit 12 until the heat loss of the duct air equals the heat gain of the passenger compartment and the preselected temperature is maintained.

A suitable position feedback device is associated with the gear train 16 to prevent hunting, or overtravel, by the motor M and the gear train.

FIG. 2 shows an assembly including a housing 45 for the heater valve 15, motor M, vacuum valve 29, blower switch 27 and the gear train 16. The valve 15 is described in detail in the above referenced U.S. Pat. to Lybrook and is not further described except to say that the valve member is moved open and closed by a screw jack type mechanism operated by the gear train 16.

The vacuum valve distributes vacuum pressure to the damper 28a and others (not shown) via vacuum outlets 46 upon operation of the gear train. The gear train rotates a valve plate 47 relative to a stationary valve plate 48 defining vacuum outlet ports.

The gear train rotatably drives contacts of the blower speed switch in response to operation of the motor M. A plurality of electrical connector prongs 50 project from the housing adjacent the switch 27. These prongs enable power to be supplied to the motor M and permit various blower motor circuits to be established through the switch 27 and the blower motor.

Figure 3:
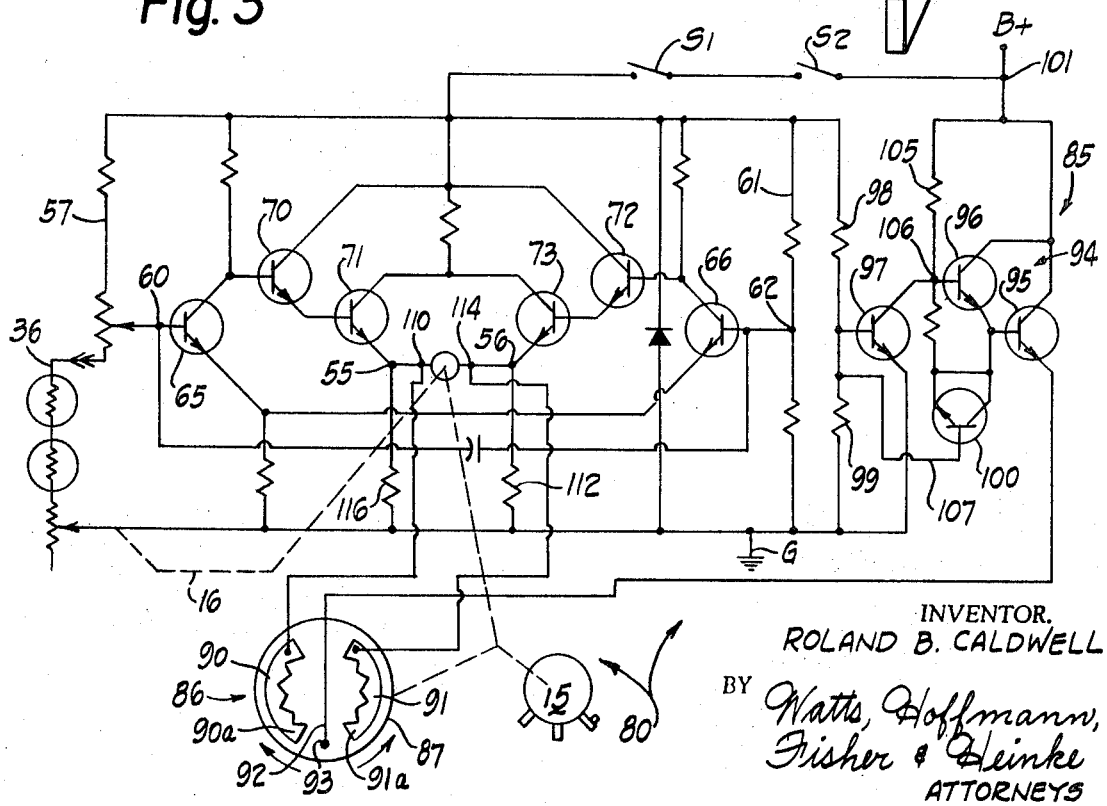
FIG. 3 is a schematic illustration of another part of the system of FIG. 1.

Referring now to FIG. 3 the circuitry 31 is schematically shown connected to the motor M. The circuitry 31 is defined by a differential amplifier circuit having the motor M connected between its output branches via output terminals 55, 56.

The input for the amplifier is provided by a temperature responsive bridge circuit having one arm 57 defined in part by the sensor string 36 and a position feedback potentiometer 53 operated by the gear train 16. The impedance of the arm 57 varies in response to sensed air temperature to provide an input or "error" signal voltage at the input terminal 60 of the amplifier. The other bridge arm 61 has a fixed impedance which produces a stable signal at the input terminal 62 of the amplifier.

The differential amplifier is a current amplifier which produces a differential voltage across the output terminals 55, 56 to energize the motor M at a speed and in a rotational direction which depends upon the unbalance of the bridge. The amplifier includes input stage transistors 65, 66 which have their base or control electrodes connected to the amplifier input terminals 60, 62, respectively, of the bridge. The emitter electrodes of these transistors are connected together to ground through a common load resistor so that the conduction of the transistors 65, 66 is proportional to the unbalance of the bridge.

Darlington connected transistors 70, 71 and 72, 73 are connected to the input stage of the amplifier. Current differences between the input stages of the amplifier are amplified and applied across the motor M by the transistor 71,73. The operation and function of differential amplifiers is generally known and accordingly the details of operation of the disclosed differential amplifier are not described here. Descriptions of differential amplifier circuitry may be found in texts relating to the subject. A somewhat similar differential amplifier arrangement is also described in detail in the above-referenced patent to Rodgers.

According to the present invention, parking circuitry 80 is provided for automatically moving the rotor of the motor M to a predetermined angular position or "park position" each time the motor controlling circuitry 31 is disconnected from the power supply. This occurs whenever the switch S1 is opened to turn off the engine or when the manual control switch S2 is opened to deenergize the control system. In the illustrated embodiment the park circuitry 80 operates the motor M to a park position in which the blower speed control switch is moved to a relatively low blower speed position (e.g., the lowest speed setting in the air conditioning mode of the system), the valve 15 is in its closed position, and the system dampers are positioned to direct air flow upwardly into the passenger compartment.

Consequently, each time the switch S1 is reclosed to start the automobile engine, or the switch S2 is closed to enable energization of the control circuitry 31, the system 10 is operated from the parked condition to a condition which is dictated by the air temperatures sensed by the elements of the sensor string 36.

The parking circuitry 80 includes series connected switches 85, 86 which establish a motor energizing circuit from the power supply B+ to one or the other of the motor terminals. The switches 85, 86 function to energize the motor M only upon opening of the switch S1 or the switch S2, and then only if the motor M is positioned away from its park position.

The switch 86 is a mechanical single pole double throw switch which controls the direction and extent of movement of the rotor of the motor M. The switch 86 includes a rotor element 87 driven by the gear train 16. The rotor 87 is preferably constructed from a printed circuit board type material which has printed conductive contact areas 90, 91 which are in the form of spaced apart arc-like bands fixed to the rotor 87. A stationary wiper 92 rides on the rotor for connecting the power supply to the motor M through one or the other of the contact arcs 90, 91 and through the switch 85. The rotor arcs are spaced apart to provide a nonconductive space 93 between adjacent ends 90a, 91a, of the arcs so that when the wiper 92 engages the rotor board in the space 93 between the arcs (FIG. 3) the switch 86 is open and the motor M is incapable of being energized through the park circuit.

The switch 85 includes a switching unit 94 defined by transistors 95, 96; a voltage detector including a transistor 97 and resistors 98, 99; and a voltage regulator including a transistor 100. The transistor 95 has its emitter-collector circuit connected in series between the wiper 92 of the switch 86 and the power supply B+ through a junction 101. Hence, when the transistor 95 is conductive, the motor M is capable of energization through the transistor 95 and switch 86. When the transistor 95 is in a nonconductive state the motor M cannot be energized through the switches 85, 86. The transistor 96 is complementarily coupled to the transistor 95 for controlling the conductive condition of the transistor 95.

The voltage detecting circuitry controls the conductive condition of the switching unit 94 in response to the position of the switches S1, S2. The resistors 98, 99 are connected in series with the power supply through the switches S1, S2. The base of the transistor 97 is connected between the resistors 98, 99 so that when the switches S1, S2 are closed, a voltage level is established at the base of the transistor 97 for rendering that transistor conductive. When the transistor 97 is conductive, its collector-emitter circuit establishes an electrical path from the power supply through the junction 101, a resistor 105, a junction 106 at the base of the transistor 96 and to ground. With the transistor 97 conducting the voltage level at the junction 106 is insufficient to permit conduction of the transistor 96. Accordingly the transistors 96, 95 are both maintained nonconductive to prevent energization of the motor M via the park circuit.

When either of the switches S1 or S2 is opened, the voltage level at the base of the transistor 97 is reduced approximately to ground voltage and consequently the voltage level at the junction 106 increases to a level sufficient to render the transistors 95, 96 conductive. This enables the motor M to be energized through the switch 86.

The voltage regulating transistor 100 prevents the transistors 95, 96 from saturating and thus regulates the current flowing to the motor M as the motor is moved to its parked position. The transistor 100 has its collector and emitter electrodes strapped together so that these electrodes are maintained at the voltage level of the emitter electrode of the transistor 96. As the transistor 96 tends to conduct heavily, the voltage level at the emitter and collector electrodes of the transistor 100 rises. When the voltage across the transistor 100 reaches a predetermined level, conduction occurs through its base electrode and to the base electrode of the transistor 97 through a conductor 107. This renders the transistor 97 conductive to the extent necessary to maintain the voltage at the base of the transistor 96 at a constant, regulated level. In this fashion, the current through the transistor 95 to the motor M is regulated.

Assuming that the ignition switch S1 or the control switch S2 is opened when the wiper 92 of the switch 86 is engaged with the conductor 90, the switch 85 is rendered conductive and a motor energizing parking circuit is established. This motor parking circuit can be traced from the terminal B+ through the switch 85 via the junction 101, through the wiper 92 and conductor 90 of the switch 86, through the motor M via a junction 10, and to ground through the terminal 56 and a resistor 112.

The motor is energized to drive the rotor 87 clockwise, as viewed in FIG. 3. When the wiper 92 and conductor 90 disengage, the motor parking circuit is interrupted to stop the motor with the system components in their parked positions (as shown in FIG. 3).

When the wiper 92 and conductor 91 are engaged at the time the switch S1 or the switch S2 is opened, the motor M is energized by parking circuit completed through the switch 85, the wiper 92 and conductor 91, a junction 114, the motor M, the terminal 55 and to ground through a resistor 116.

The rotor 87 is then driven counterclockwise as viewed in FIG. 3 until the wiper 92 is disengaged from the conductor 91. The motor M is thus deenergized with the system components in their parked positions.

While a preferred embodiment of the present invention has been illustrated and described herein in considerable detail, the present invention is not to be considered limited to the precise construction shown. Various modifications, adaptions and uses of the invention may occur to those skilled in the art to which the invention relates and it is the intention to cover all such modifications, adaptations and uses which come within the scope of the invention as hereinafter claimed.

What is claimed is:

1. In an air tempering system in which tempering of air in the system is controlled by positioning of a movable member:
   a. an electric power supply;
   b. an electrically operated servomechanism for effecting movement of said member to positions between a first position wherein air in said system is tempered to a first extreme of a temperature range and a second position wherein air temperatures approach a second extreme of the temperature range;
   c. control circuitry for operating said servomechanism to control positioning of said member in response to changes in a sensed condition;
   d. A control switch having a closed condition for completing an energizing circuit through said control circuitry from said power supply and an open condition for interrupting said energizing circuit;
   e. switching circuitry operative in response to actuation of said control switch to said open condition, to energize said servomechanism for moving said member to a predetermined position in response to said control switch being operated to said open condition when said member is away from said predetermined position; and
   f. means rendering said switching circuitry inoperative to energize said servomechanism in response to movement of said member to said predetermined position.

2. An air tempering system as defined in claim 1 wherein said switching circuitry comprises switch means connected in series between said power supply and said servomechanism and in parallel with said control switch, and a detecting circuit for maintaining said switch means nonconductive when said control switch is in said closed condition, said detecting circuit effective to detect when said control switch is in said open condition and operate said switch means to a conductive condition.

3. In an air tempering system as claimed in claim 2 wherein said switch means includes an electronic switch having power electrodes connected in series with said servomechanism and a control electrode connected to said detecting circuit.

4. In a system as claimed in claim 3 and further including second switch means between said first switch means and said servomechanism, said second switch means including a first contact electrically connected to one terminal of said servomechanism, a second contact electrically connected to another terminal of said servomechanism and a third contact individually engageable with said first or second contacts for completing energizing circuits for said servomechanism through said first and second switch means, said first and second contacts moving relative to said third contact in response to energization of said servomechanism.

5. A system as claimed in claim 4 wherein said first and second contacts are spaced apart and said third contact moves out of electrical engagement with said first and second contacts to interrupt energizing circuit for said servomechanism when said movable member is moved to said predetermined position.

6. In an air tempering system as claimed in claim 2 wherein said switching circuitry further includes a second switch means operated by said servomechanism, said second switch means having a conductive condition to enable conduction through said first switch means to said servomechanism when said movable member is away from said predetermined position, said servomechanism energized to drive said movable member toward said predetermined position and to operate said second switch means to a nonconductive condition when said movable member is in said predetermined position.

7. In an air tempering system as claimed in claim 6 wherein said second switch means comprises three contacts and support structure for effecting relative movement between two of said contacts and the third contact, said support structure including a movable nonconducting contact supporting member drivingly connected to said servomechanism, said third contact and one of said two contacts engaged when said movable member is away from said predetermined position in the direction of said first position, and said third contact and the other of said two contacts engaged when said movable member is away from said predetermined position toward said second position, said third contact disengaged from both of said two contacts when said movable member is at said predetermined position.

8. In a system as claimed in claim 7 wherein engagement of said third and said one of said other two contacts enables energization of said servomechanism to drive said movable member toward said second position, and engagement of said third contact and said other of said two contacts enables energization of said servomechanism to drive said movable member toward said first position.

9. In a system as claimed in claim 7 wherein said contact supporting member is rotated by said servomechanism and said two contacts are fixed to said supporting member for rotation therewith, said third contact engaging said supporting member and fixed against rotation therewith.

10. In a temperature control system for tempering air directed to a passenger compartment of a vehicle having at least an air heating heat exchanger in a duct and an electrically energized blower for directing air through the duct:
  a. a member movable from a first position to enable maximum heat transfer to air from said heat exchanger to a second position for minimizing heat transfer to the air from said heat exchanger;
  b. a servomechanism for operating said member between said first and second positions and to positions between said first and second positions whereby the temperature of air exhausted from the duct is controlled;
  c. a speed control switch for said blower, said servomechanism drivingly connected to speed control switch for operating said speed control switch to vary the speed of said blower to provide maximum blower speed when said member is in either of said first or second positions and lesser blower speeds when said member is located between said first and second positions;
  d. electrically energized circuitry for controlling operation of said servomechanism in response to sensed air temperature in the passenger compartment;
  e. said circuitry rendered effective to control said servomechanism when connected across an electric power supply through a control switch which is closed when the vehicle is operating and open when the vehicle is not operating; and,
  f. a servomechanism operating network for causing said servomechanism to move at least said speed control switch to a position for operating said blower at a speed less than said maximum speed whenever said switch is open.

11. A system as claimed in claim 10 wherein said servomechanism includes a reversible electric motor drivingly connected to said blower speed switch and to said movable member.

12. An air tempering system of the character defined in claim 1 further characterized by said predetermined position of said movable member being said first position.

13. In an air tempering system for an engine driven vehicle having manually operated engine operating control means and in which the air in the vehicle is tempered by a member movable between first and second extreme air tempering control positions,
  a. electrically controlled servomechanism for effecting movement of said member in response to changes in temperature of air in the vehicle;
  b. and means actuated by said engine control means and moving said member to a predetermined control position in response to termination of operation of said engine.

* * * * *